United States Patent
Nakamura et al.

(10) Patent No.: US 6,754,792 B2
(45) Date of Patent: Jun. 22, 2004

(54) METHOD AND APPARATUS FOR RESYNCHRONIZING PAIRED VOLUMES VIA COMMUNICATION LINE

(75) Inventors: Yasuaki Nakamura, Tokyo (JP); Hideo Tabuchi, Tokyo (JP); Akinobu Shimada, Tokyo (JP); Toshio Nakano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 252 days.

(21) Appl. No.: 09/797,479

(22) Filed: Feb. 28, 2001

(65) Prior Publication Data

US 2002/0078296 A1 Jun. 20, 2002

(30) Foreign Application Priority Data

Dec. 20, 2000 (JP) ........................................ 2000-391833

(51) Int. Cl.[7] .............................................. G06F 12/00
(52) U.S. Cl. ........................ 711/162; 711/161; 711/100; 711/112; 711/114; 714/6; 714/7
(58) Field of Search ................................ 711/161, 162, 711/114, 100, 111, 112, 4, 5; 714/6, 7

(56) References Cited

U.S. PATENT DOCUMENTS

| | | | |
|---|---|---|---|
| 5,446,871 A | | 8/1995 | Shomler et al. |
| 5,692,155 A | * | 11/1997 | Iskiyan et al. ............. 711/162 |
| 5,875,479 A | * | 2/1999 | Blount et al. .............. 711/162 |
| 5,896,548 A | * | 4/1999 | Ofek ........................... 710/20 |
| 6,044,444 A | * | 3/2000 | Ofek ........................... 711/162 |
| 6,052,758 A | * | 4/2000 | Crockett et al. ............ 711/113 |
| 6,101,497 A | | 8/2000 | Ofek |
| 6,353,878 B1 | * | 3/2002 | Dunham .................... 711/162 |
| 6,360,330 B1 | * | 3/2002 | Mutalik et al. ............. 714/4 |
| 6,401,178 B1 | * | 6/2002 | Gagne et al. ............... 711/162 |
| 6,446,176 B1 | * | 9/2002 | West et al. ................. 711/162 |
| 6,499,112 B1 | * | 12/2002 | Milillo et al. .............. 714/6 |

FOREIGN PATENT DOCUMENTS

| | | |
|---|---|---|
| EP | 0617362 A1 | 9/1994 |
| EP | 1058190 A2 | 12/2000 |
| JP | 6-290125 | 10/1994 |
| JP | 11-085408 | 3/1999 |
| WO | WO 00/49500 A1 | 8/2000 |

* cited by examiner

Primary Examiner—Matthew Kim
Assistant Examiner—Zhuo H. Li
(74) Attorney, Agent, or Firm—Towsend and Towsend Crew LLP (57) ABSTRACT

A storage system data duplication method for copying data of a plurality of logical volumes possessed by a first storage system to a second storage system includes the steps of: (a) copying the data of the plurality of logical volumes to the second storage system; (b) interrupting copying of the data of the plurality of logical volumes to the second storage system; (c) starting copying of data of one or more of the plurality of logical volumes to the second storage system; and starting copying of data of ones of the plurality of logical volumes other than the one or more logical volumes to the second storage system as delayed from the step (c), shortening a time taken until completion of data duplication on recreation of a group of paired logical volumes in a volume group after remote copy is temporarily stopped.

11 Claims, 8 Drawing Sheets

| DIVISION | STATUS TRANSITION OF PAIRED LOGICAL VOLUME | | | MCU STATUS MANAGEMENT TABLE | | | | RCU STATUS MANAGEMENT TABLE | |
|---|---|---|---|---|---|---|---|---|---|
| | P-VOL | S-VOL | T-VOL | P-VOL | P-VOL STATUS | S-VOL | PAIRED VOLUME RECREATION ATTRIBUTE | S-VOL | S-VOL STATUS |
| (1) | P-VOL DUPLEX —COPY STOP→ | S-VOL DUPLEX DUPLEX→ | T-VOL DUPLEX | 0-0:01 | DUPLEX | 1-0:01 | ENABLE → DISABLE | 1-0:01 | DUPLEX |
| | P-VOL DUPLEX → | S-VOL DUPLEX DUPLEX→ | T-VOL DUPLEX | 0-0:02 | DUPLEX | 1-0:02 | ENABLE | 1-0:02 | DUPLEX |
| (2) | P-VOL SUSPEND → | S-VOL SUSPEND DUPLEX→ | T-VOL DUPLEX | 0-0:01 | SUSPEND | 1-0:01 | DISABLE | 1-0:01 | SUSPEND |
| | P-VOL SUSPEND → | S-VOL SUSPEND DUPLEX→ | T-VOL DUPLEX | 0-0:02 | SUSPEND | 1-0:02 | ENABLE | 1-0:02 | SUSPEND |
| (3) | P-VOL SUSPEND → | S-VOL SUSPEND SUSPEND→ | T-VOL SUSPEND | 0-0:01 | SUSPEND | 1-0:01 | DISABLE | 1-0:01 | SUSPEND |
| | P-VOL SUSPEND → | S-VOL SUSPEND SUSPEND→ | T-VOL SUSPEND | 0-0:02 | SUSPEND | 1-0:02 | ENABLE | 1-0:02 | SUSPEND |

| DIVISION | STATUS TRANSITION OF PAIRED LOGICAL VOLUME | | | MCU STATUS MANAGEMENT TABLE | | | | RCU STATUS MANAGEMENT TABLE | |
|---|---|---|---|---|---|---|---|---|---|
| | P-VOL | S-VOL | T-VOL | P-VOL | P-VOL STATUS | S-VOL | PAIRED VOLUME RECREATION ATTRIBUTE | S-VOL | S-VOL STATUS |
| (4) | P-VOL SUSPEND → P-VOL DUPLEX | S-VOL SUSPEND → S-VOL DUPLEX SUSPEND | T-VOL SUSPEND T-VOL SUSPEND | 0-0:01 0-0:02 | SUSPEND DUPLEX | 1-0:01 1-0:02 | DISABLE ENABLE | 1-0:01 1-0:02 | SUSPEND DUPLEX |
| (5) | P-VOL DUPLEX → P-VOL DUPLEX | S-VOL DUPLEX SUSPEND → S-VOL DUPLEX SUSPEND | T-VOL SUSPEND T-VOL SUSPEND | 0-0:01 0-0:02 | DUPLEX DUPLEX | 1-0:01 1-0:02 | DISABLE → ENABLE ENABLE | 1-0:01 1-0:02 | DUPLEX DUPLEX |
| (6) SAME AS (1) | P-VOL DUPLEX P-VOL DUPLEX | S-VOL DUPLEX DUPLEX S-VOL DUPLEX DUPLEX | T-VOL DUPLEX T-VOL DUPLEX | 0-0:01 0-0:02 | DUPLEX DUPLEX | 1-0:01 1-0:02 | ENABLE ENABLE | 1-0:01 1-0:02 | DUPLEX DUPLEX |

| VG#=0001 | | JUSTIFIED TIME = 00:00:00 | |
|---|---|---|---|
| P-VOL (MCU#-VOL#) | S-VOL (RCU#-VOL#) | STATUS | PAIRED VOLUME RECREATION ATTRIBUTE |
| 0-0:01 | 1-0:01 | DUPLEX | ENABLE |
| 0-0:02 | 1-0:02 | DUPLEX | ENABLE |
| 0-0:03 | 1-0:03 | SUSPEND | ENABLE |
| 0-0:04 | 1-0:04 | SUSPEND | DISABLE |

METHOD AND APPARATUS FOR RESYNCHRONIZING PAIRED VOLUMES VIA COMMUNICATION LINE

BACKGROUND OF THE INVENTION

The present invention relates to storage systems for storing data for a computer to read and write and more particularly, to a storage system based on a method for duplicating data possessed by the storage system.

Data of a disk subsystem (storage system) possessed by a main data center might be lost due to an accident such as an earthquake. In order to avoid such data loss, there is a method for recovering the data loss by previously creating a copy of the data in the disk subsystem (storage system), that is, by previously duplicating the data. The data duplicating method has been already put in practical use in the form of a so-called remote copying function.

The remote copying function is a function of not only providing a function of backuping the contents of data possessed by the main center into a remote center merely as data contents at a time point but also writing the data to be written even into a disk subsystem of the remote center when a host computer (host unit) of the main center issues a data write instruction to the disk subsystem. As a result, when some fault takes place in the system of the main center and this causes data of the disk subsystem of the main center not to be used, the processing of the main center can be immediately continued by using the data possessed by the disk subsystem of the remote center.

In this case, in order to continue the processing of the main center, it is necessary that the disk subsystem of the remote center have data consistent to the data of the main center at the time of the fault. In other words, the writing sequence of the data at the remote center must be consistent to the writing sequence of data at the main center.

Several techniques for holding such consistency of the data writing sequence are disclosed. For example, in U.S. Pat. No. 5,446,871 (JP-A-6290125) and JP-A-11-85408, in a remote copying system for making a copy asynchronously with the data writing operation of a disk subsystem of a main center, a host unit or disk subsystem of a remote center executes write-data reflecting operation on the basis of time information attached to the data.

When a database is duplicated by a remote copy function, for example, data to be duplicated include, e.g., a data main body of the database and log data having data writing histories written therein. The data main body is closely associated with the log data, so that, a transaction of a data writing took place, the data writing transaction is completed not only by writing the data main body into the database but also by writing the write contents into the log data, thus ensuring the consistency of the data contents. In such a database that the consistency of the data contents is ensured by the aforementioned method, system design is often made so that the data main body and log data are recorded in different disk subsystem volumes from a viewpoint of reliability. Even when the data main body and log data stored in the respective volumes of the different disk subsystems are duplicated by the remote copying function, the contents of the data main body and log data copied to the volumes of the remote center must have a consistency. To this end, with respect to the remote copying function, even when the data main body and log data are written to the volumes of the disk subsystems in the main center, data writing must be carried out in the same data writing sequence as in the main center even in the remote center. In order to realize this currently, a pair of volumes is made by a volume (source volume of copy) possessed by the disk subsystem of the main center to be subjected to execution of a remote copy and a volume (target volume of copy) possessed by the disk subsystem of the remote center, a single group (which will be referred to as the volume group, hereinafter) is made by a set of such paired volumes and is collectively managed, whereby the data writing sequence at the remote center is held and the consistency of the data contents is ensured.

And when the data main body or log data is transmitted from the main center to the remote center, the transmission may sometimes be carried out via a public network.

SUMMARY OF THE INVENTION

In the technique described above, a set (a group of paired logical volumes) of paired logical volumes requiring consistency of the data contents between the main center and remote center must be controlled on a collective management basis as a single group (volume group). In such a control system, for example, when ones of a plurality of data transfer units forming data transfer lines for connection between the disk subsystems of the main center and remote center is stopped due to its scheduled maintenance or the like, for the purpose of maintaining the consistency of data contents, all the paired logical volumes within the volume group must be put in their status wherein copying from the copy source to the copy target is temporarily stopped (which status will be referred to as the suspend, hereinafter). After put in the suspend status, the paired logical volumes can be again duplicated (which will be called the paired volume recreation, hereinafter) by again booting the data transmission line so far stopped.

In the collective management based on the volume group, however, even when ones of the data transfer units is stopped for example, the paired logical volumes not affected by maintaining the duplication have also been put in their suspend status and the suspend status has been continued until the rebooting of the stopped unit ends, for the purpose of maintaining the contents consistency. For this reason, in the paired volume recreation after completion of the suspend status, as the capacity of an object to be subjected to remote copying operation is huge, a time taken until the completion of duplication (copy) upon the paired volume recreation becomes enormous. That is, when it is desired to send data (huge capacity) belonging to the respective paired logical volumes in the volume group from the copy source to the copy target, even the transmission of the data concurrently from the plurality of data transfer units in the subsystem, these plural data are sent onto a public network line having a capacity smaller than a total of the capacities of the data transfer units. For this reason, the time taken until completion of duplication upon the paired volume recreation becomes enormous.

It is therefore an object of the present invention to provide a method for shortening a time taken until completion of data duplication upon recreation of a group of paired logical volumes in a volume group after remote copy is temporarily stopped.

The above object is attained by providing a data duplicating method in a storage system for copying data of a plurality of logical volumes possessed by a first storage system to a second storage system. The method includes a first step of starting copying of data of one of the plurality of logical volumes to the second storage system, and a second step of starting copying data of the other logical volumes than the one logical volume of to the second storage system.

DETAILED DESCRIPTION OF THE EMBODIMENTS

The present invention is directed to a duplication system for selecting ones of paired logical volumes in a volume group ensuring consistency of data contents and enabling sequential paired volume recreation of the volumes in the volume group on each volume basis, when the system is put in its status (suspend) wherein copying of all the paired logical volumes in the volume group is temporarily stopped. In other words, in the prior art, it is necessary to perform simultaneous paired volume recreation over all the paired logical volumes in the volume group due to the consistency of data contents; whereas, in the present invention, the logical volumes enabling immediate paired volume recreation are immediately subjected to the paired volume recreation, and the logical volume disabling the paired volume recreation is subjected to the paired volume recreation after its disabled reason is removed (e.g., after restoration of a data transfer unit). As a result, since the capacity of the paired logical volumes after the disable reason of the paired volume recreation is removed becomes smaller than that when the paired volume recreation is collectively carried out on each volume group basis, a time taken until completion of the duplication of the paired logical volumes in the volume group can be reduced.

In the present invention, since paired volume recreation is sequentially carried out on each volume basis, there is no consistency of the data contents with the target volume of copy during the paired volume recreation. If a fault occurs in any of the paired logical volumes, then the target volume of copy cannot be utilized for data restoration of the source volume of copy at the main center. This means that, when a database is taken as an example, the paired volume recreation is carried out with times shifted between the target volume of copy having the data main body already written thereto and the target volume of copy having the log data already written thereto, so that there is no consistency in the data contents, so long as the paired volume recreation of the both data is not completed.

For the purpose of avoiding this, in accordance with the present invention, prior to execution of the paired volume recreation, the disk subsystem makes a replication of the target volume of copy at the time of putting the system in its suspend status to a volume different from the target volume of copy. Thereby, even when a fault takes place in any of the paired logical volumes during the paired volume recreation, data until the system was put in the suspend status can be restored by using the replication.

Explanation will be made below as to an embodiment with reference to accompanying drawings. However, the present invention will not be limited to the following explanation.

Figure 1:
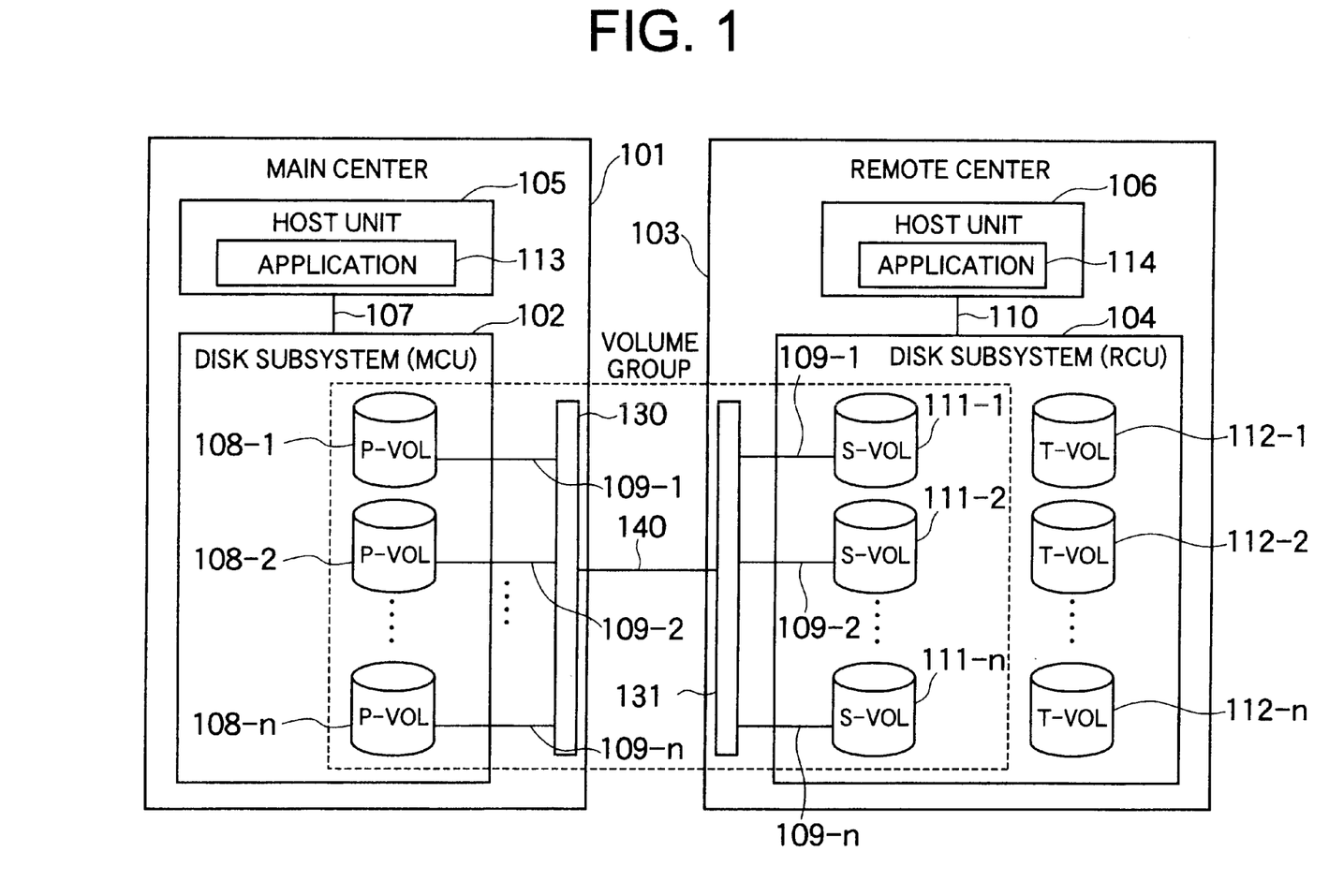
FIG. 1 schematically shows an arrangement of a remote copy system in an embodiment.

FIG. 1 is an arrangement of a system for duplicating data between two data centers each equipped with a host unit, respectively.

A disk subsystem (MCU) 102 as a data storage system in a main center 101 as well as a disk subsystem (RCU) 104 as a data storage system in a remote center 103 are connected to each other without intervention of host units 105 and 106, thus realizing a remote copy system for duplicating data possessed by the MCU 102 to the RCU 104.

In the main center 101, the MCU 102 is connected to the host unit 105 having a central processing unit (CPU) for data processing of read and write to the MCU 102 via an interface cable 107. The MCU 102 has a plurality of primary volumes (P-VOLs) 108 (108-1, 108-2, . . . , and 108-*n*) for storage of data to be read and written by the host unit 105.

Meanwhile, in the remote center 103, the RCU 104 is connected to the host unit 106 having a CPU via an interface cable 110. When the host unit 105 of the main center 101 cannot perform its main function due to a an accident, fault or the like, the host unit 106 performs the function in place of the host unit 105. Even in the case of any fault other than the accident, fault or the like, the processing different from that of the host unit 105 of the main center 101 can be executed independently of the host unit 105 by utilizing data stored in the RCU 104. Further, the RCU 104 has a plurality of secondary volumes (S-VOLs) 111 (111-1, 111-2, . . . , and 111-*n*) and a plurality of third volumes (T-VOL's) 112 (112-1, 112-2, . . . , and 112-*n*) for storage of data to be read and written by the host unit 106.

When the host unit 105 in the main center 101 issues a data write instruction to the primary volumes P-VOLs (108-1, 108-2, . . . , and 108-*n*) possessed by the MCU 102, this write data instruction is sent toward the secondary volumes S-VOLs (111-1, 111-2, . . . , and 111-*n*) through respective interface cables (109-1, 109-2, . . . , and 109-*n*) associated with the respective P-VOLs (108-1, 108-2, . . . , and 108-*n*) and S-VOLs (111-1, 111-2, . . . , and 111-*n*). At this time, the write data sent from the interface cables are multiplexed by multiple lines and a public network interface I/F 130 on the way and then sent toward the secondary volumes S-VOLs via a specific public line 140 of the public network. That is, during copying operation of the write data to the secondary volumes S-VOLs, all the write data are passed through the public line 140. Accordingly when the public line has a heavy traffic at a time, the line becomes a bottleneck. In this connection, the public network interface I/F 130 may be connected to the interface cable in a 1:1 relationship.

In accordance with the present invention, in the paired volume recreation after temporary stoppage of the volume group which imposes a heavy traffic to the public line at a time, the traffic peak is dispersed with respect to time to shorten a time necessary for the paired volume recreation, which will be further explained later.

Figure 2:
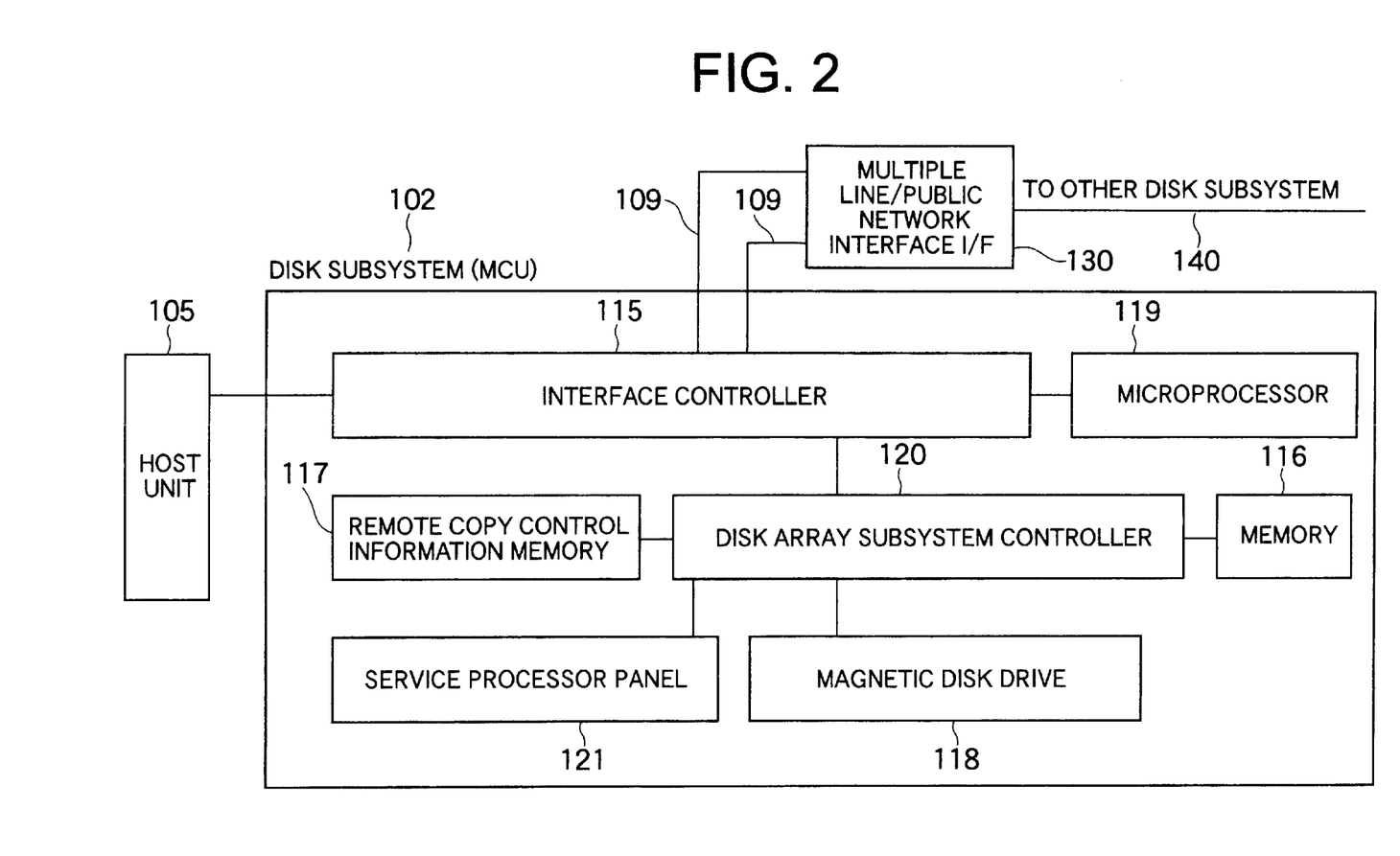
FIG. 2 shows an arrangement of a disk subsystem in the embodiment.

FIG. 2 shows an internal structure of the MCU 102. The MCU 102 includes an interface controller 115 for data transfer from and to the host unit, a memory 116 for temporarily storing data to be read or written by the host unit therein, a remote copy control information memory 117 for storing information about a storing address (storing location) of data to be written whose remote copy is temporarily stopped, magnetic disk drives 118 as a recording media for recording the data of the host unit 105 therein, a microprocessor 119 for controlling transaction of these data, a disk array subsystem controller 120 for controlling these elements, and a service processor panel 121 on which a user can monitor an execution status of the remote copy and can set how to set the remote copy. In this case, the magnetic disk drive 118 has such a plurality of primary volumes (P-VOLs) 108 (108-1, 108-2, . . . , and 108-$n$) as shown in FIG. 1 for storage of data to be read and written by the host unit 105.

The MCU 102 shown in FIG. 2 has the interface controller 115 through which transmits and receives data to and from the remote center 103. And extended from the interface controller 115 are such an interface cables (109-1, 109-2, . . . , and 109-$n$) as shown in FIG. 1. These interface cables are connected to the multiple line/public network interface I/F 130. The multiple line/public network interface I/F 130 transmits the data received from the respective interface cables to a multiple line/public network interface I/F 131 of the remote center via the public line 140. The multiple line/public network interface I/F 131 of the remote center is connected to the interface controller of the RCU 104 via the interface cables. With this arrangement, when it is desired to perform remote copy from the main center to the remote center, data transmission can be realized on mutually different communication lines associated with the respective logical volumes within each subsystem, but since communication of all the logical volumes is carried out through a single public line on the public network, load concentration takes place for the data transmission. In the present invention, there is provided a method for dispersing a concentrated load especially at the time of the paired volume resynchronization with respect to time to shorten a time necessary for the paired volume re-synchronization.

In this connection, interface cables 109 connected between the centers comprises, e.g., an optical fiber link or an optical fiber cable which is driven by an LED driving unit based on an interface protocol generally known as fiber channel. The public line 140 is an electrical communication link such as a typical T3 or ATM network, while the public network interface I/F 130 is a data transfer unit which is typical of a channel extender or a fiber channel switch and which can extend an interface connection distance. Accordingly a general fiber channel, a T3 network or the like can be connected between the MCU 102 and RCU 104.

Explanation will be continued by turning again to FIG. 1. The MCU 102 performs usual reading and writing operation of data by the host unit 105 with respect to the P-VOLs 108 of the MCU 102, and also performs control of copying operation of the data of the P-VOLs 108 to the S-VOLs 111 of the RCU 104.

More specifically, the MCU 102 manages the structure of the paired logical volumes and the copy execution status of the paired logical volumes that are formed by a pair of the P-VOL 108 and the S-VOL 111 as a copy target, for example, by a pair of the P-VOL 1081 and S-VOL 111-1 or by a pair of the P-VOL 108-2 and S-VOL 111-2, and so on. The RCU 104 manages the write execution of data transmitted from the MCU 102 and the structure and status of the paired logical volumes.

In this connection, the word "status" shows a copy execution status between the P-VOL 108 and S-VOL 111 and has two status of 'duplex' and 'suspend'. The 'duplex' means a duplication status in which a paired relationship between the P-VOL 108 and S-VOL 111 is maintained, and in other words, it also a status in which it reflects the writing operation of the P-VOLs 108 sequentially on the S-VOLs 111. The 'suspend' means a status in which reflecting operation of the write data of the P-VOLs 108 on the S-VOLs 111 is temporarily stopped with the paired relationship therebetween maintained. These status can be transited by a command which is issued from an application 113, 114, the service processor panel 121 of the disk subsystem or an application of a console connected directly to the disk subsystem by a LAN to the paired logical volumes.

In the present embodiment, also, it is assumed that a volume group having the consistency of data contents includes paired logical volumes of the P-VOL 108 and S-VOL 111. Thus, when the paired logical volumes are in their duplex status, the writing sequence of the P-VOLs 108 is made to coincide with the write reflecting sequence to provide a consistency to the data contents of the P-VOLs 108 and S-VOLs 111.

Further, T-VOLs 112 possessed by the RCU 104 in the present invention are a group of logical volumes in which a replication of the S-VOLs 111 are stored when all the paired logical volumes of the P-VOL 108 and S-VOL 111 defined as a volume group are put in the suspend status. In this case, a technique for making copies of the S-VOLs 111 to the T-VOLs 112 in the present embodiment is not described in detail herein. However, the remote copy function is a technique for duplicating data between the disk subsystems, while the copy making technique utilizes a known technique for duplicating data within the same disk subsystem. In the present embodiment, the S-VOLs 111 and the T-VOLs 112 within the same disk subsystem form a pair of paired logical volumes and the data of the S-VOLs 111 are duplicated to the T-VOLs 112.

Figure 4:
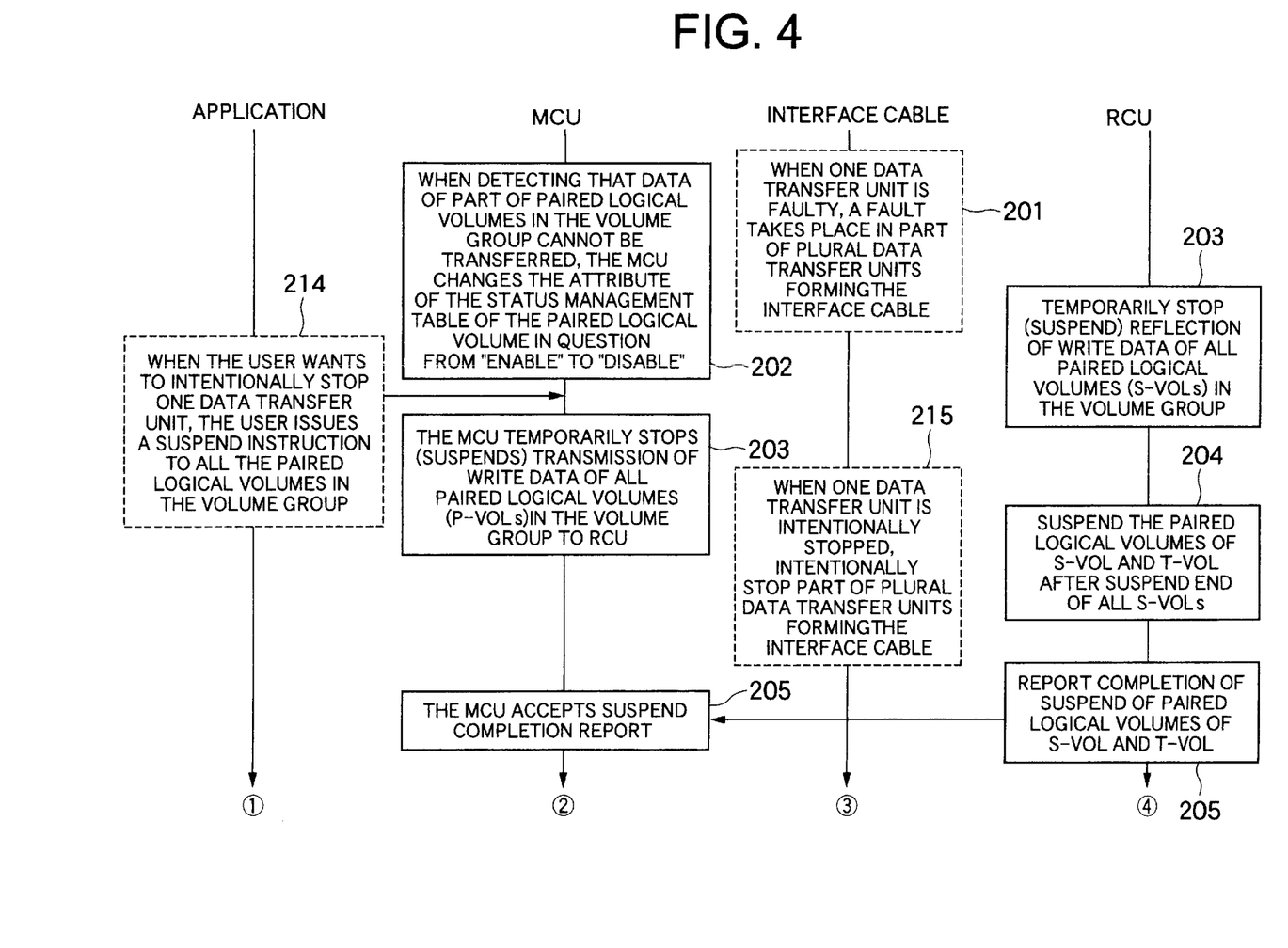
FIG. 4 is a flowchart showing a part of a procedure of operations at the time of stopping a data transfer unit.
Figure 5:
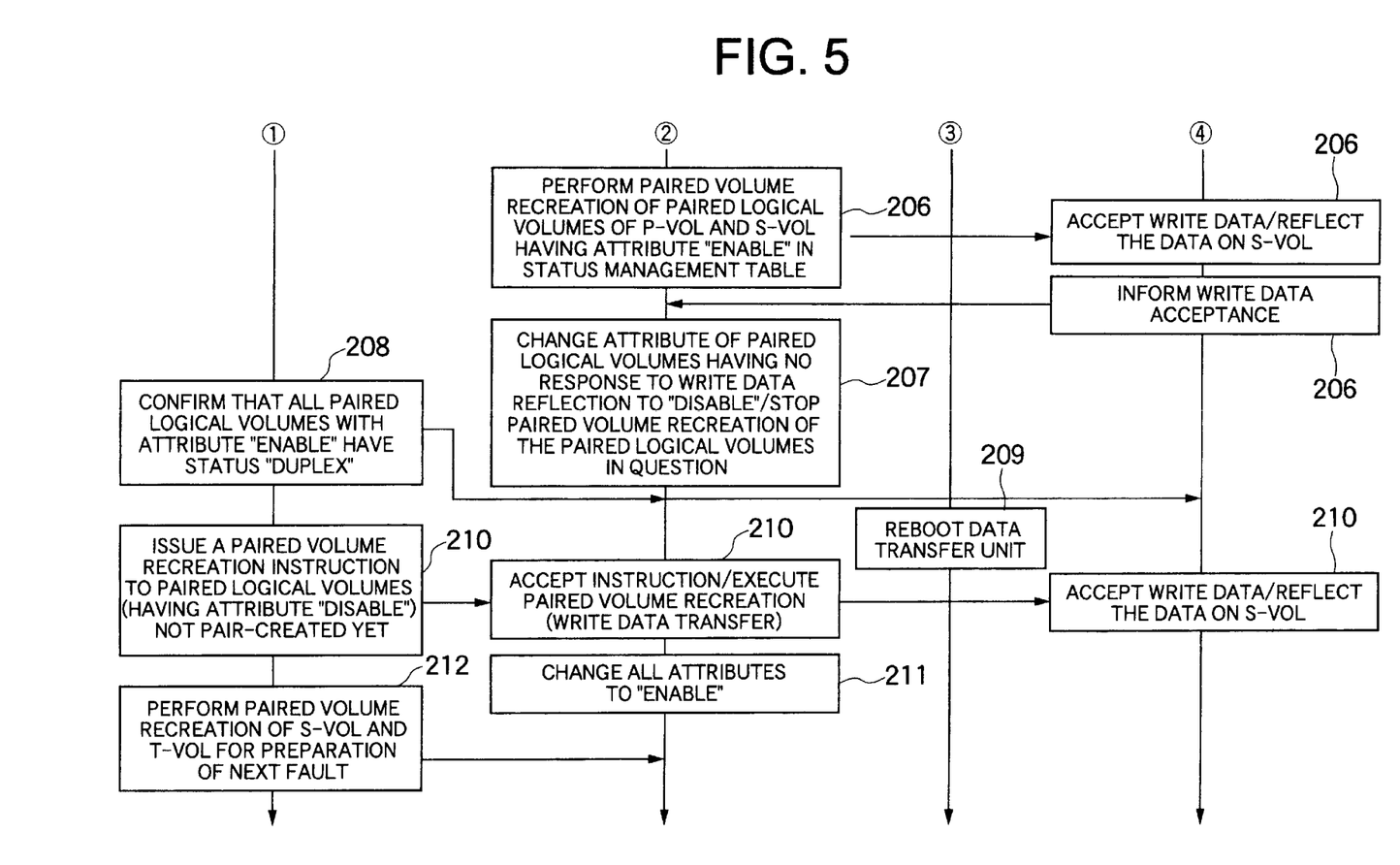
FIG. 5 is a continuation of FIG. 4.

FIG. 4 and FIG. 5 (a continuation of FIG. 4) show, when data is duplicated by the MCU 102 and RCU 104 in the remote copy arrangement of FIG. 1, a processing procedure for explaining how to temporarily stop the copying or duplicating operation of all the paired logical volumes in the volume group by an unexpected accident or an intended stoppage caused by the maintenance of a part of the data transfer units formed by the interface cables 109 and multiple line/public network interface I/F 130, and then how to again duplicate all the paired logical volumes in the volume group. Explanation will be detailed as to a procedure of shortening a time necessary for the duplication of all the paired logical volumes after temporary stoppage of the copying operation in the present invention, by referring to these drawings. In this connection, in order to explain the status of each paired logical volume, the following description will be made as necessary by referring to FIG. 6 and FIG. 7 (a continuation of FIG. 6).

Explanation will first be made as to the assumption conditions of the operation. It is assumed that, prior to stoppage of the data transfer units (forming the interface cables), the P-VOLs 108 in the MCU 102 and the S-VOLs 111 in the RCU 104 are formed as paired logical volumes, the S-VOLs 111 and T-VOLs 112 in the RCU 104 are formed as paired logical volumes, and the status of the paired logical volumes are of the duplex. Under this conditions, when the host unit 105 writes the respective P-VOLs 108 of the MCU 102, the remote copying operation causes the S-VOLs 111 in the RCU 104 to reflect the write data and also causes the T-VOLs 112 making a pair with the S-VOL 111 to reflect the write data via the S-VOL 111 in the RCU 104, thus resulting in that the data contents are made identical between these three logical volumes.

It is also assumed that, as has been explained FIGS. 1 and 2, there are a plurality of the interface cables 109 (109-1, 109-2, . . . , and 109-n) for data transfer between the MCU 102 and RCU 104, and the data transfer of the paired logical volumes of the P-VOL 108 and S-VOL 111 is carried out independently of the respective interface cables. For example, a pair of the P-VOL 108-1 and S-VOL 111-1 is associated with the interface cable 109-1. Accordingly, when a part of the data transfer units forming the interface cables 109 is stopped by an intended stoppage for its maintenance or by an accident, one of the paired logical volumes of the P-VOL 108 and S-VOL 111 so far using the interface cable including the stopped data transfer unit cannot perform its data transfer, which means that a fault took place in the paired logical volumes. In this connection, the data transfer units forming the interface cables include, in addition to the main bodies of the interface cables, the public network interface I/F 130 and a transmission control circuit part included in the interface controller 115 connected to the interface cables (109-1, 109-2, . . . , and 109-n), though not shown in FIG. 2.

The assumptions have been explained. Explanation will next be made in detail as to the paired volume re-synchronization after the stoppage of the data transfer unit, by dividing the explanation into two cases when the unit stoppage is made by an unexpected accident and when the unit stoppage is made by an intended stoppage.

(1) Unexpended Accident

When a fault took place in a part of a plurality of data transfer units forming the interface cables 109 and multiple line/public network interface I/F 130 (step 201 in FIG. 4), the MCU 102 has expected a response indicative of data acceptance from the RCU 104 but actually detects no response, whereas, the RCU 104 detects no data transmission from the MCU 102, whereby the MCU 102 and RCU 104 judge that the duplication of the paired logical volumes cannot be maintained.

Next the MCU 102 changes 'enable' to 'disable' of an attribute of the P-VOL 108 in question which cannot maintain the maintenance of the duplication in a status management table managed by the MCU 102 (refer to FIGS. 6 and 7) (step 202). In this case, the status management table is a table which is possessed and managed by the MCU 102 and RCU 104 and is shown in FIGS. 6 and 7.

Figure 6:
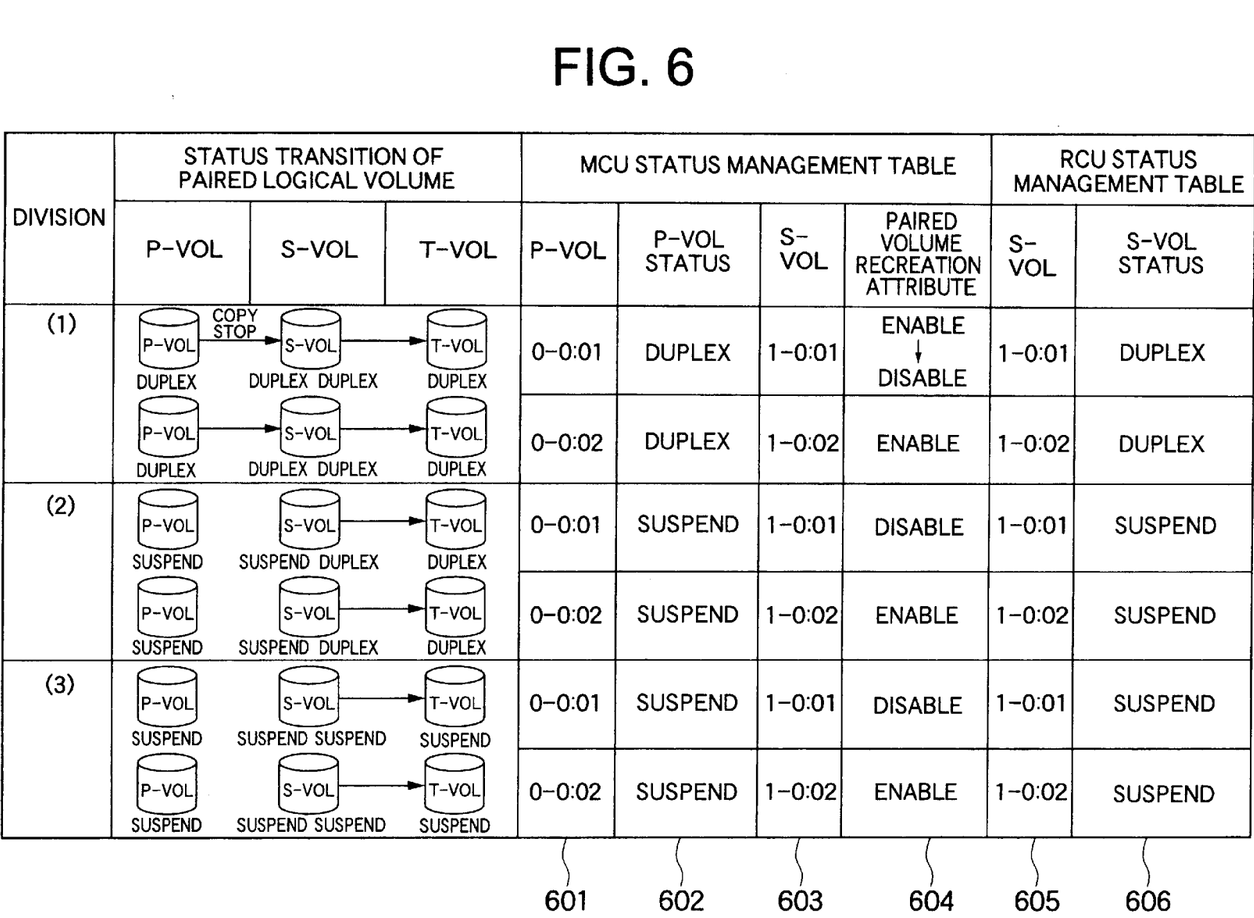
FIG. 6 shows status of paired logical volumes and transition status of the status management table in operations of steps.
Figure 7:
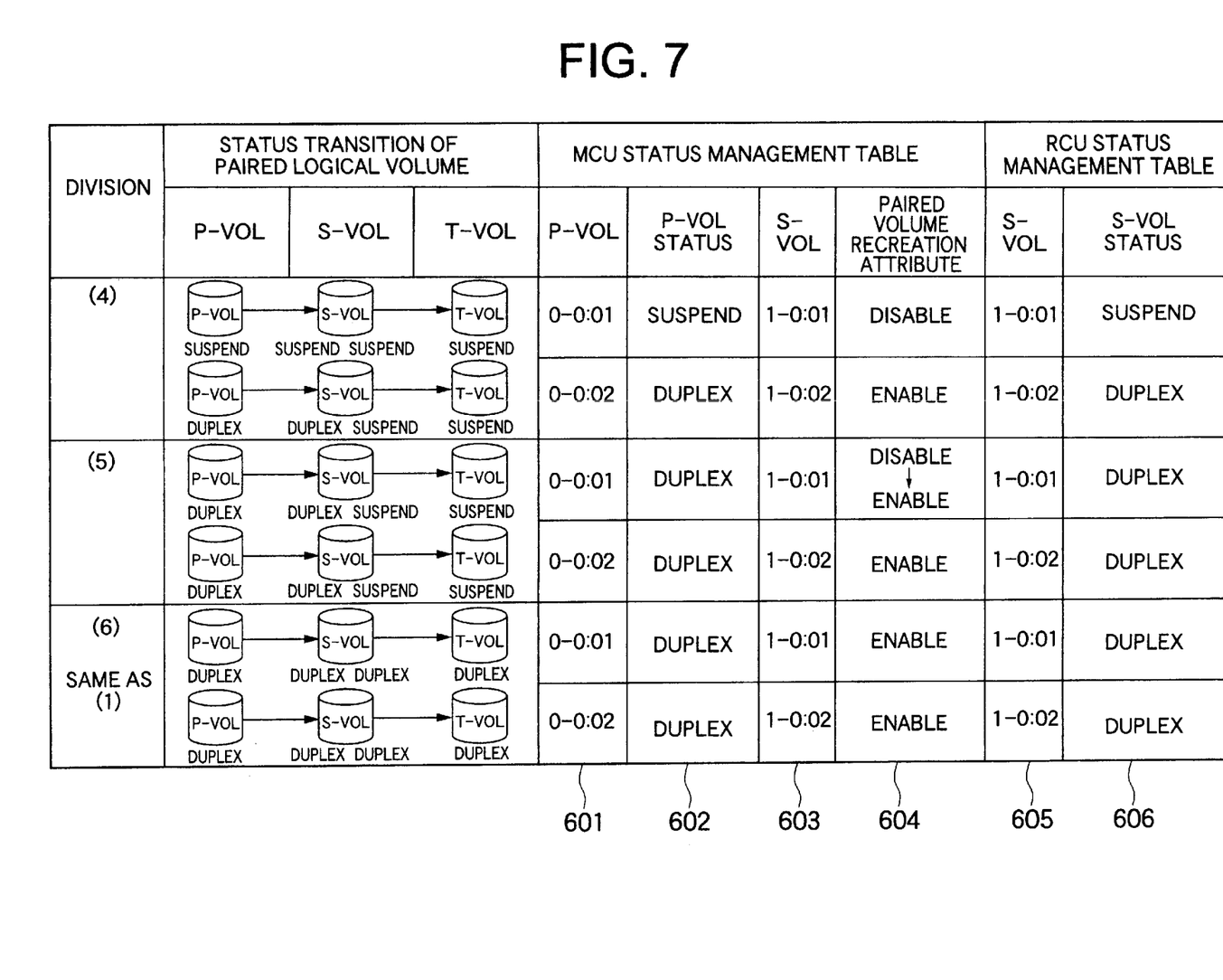
FIG. 7 is a continuation of FIG. 6.

The status management table of the MCU 102 in FIGS. 6 and 7 manages logical volume numbers 601 (manufacturing number of the disk subsystem ("0" in the drawings) and logical volume numbers ("0:01" and "0:02" in the drawings) of the disk subsystem) of the P-VOLs 108; copy execution statuses 602 of "duplex" and "suspend" of the P-VOLs 108; logical volume numbers(the manufacturing number of the disk subsystem as a target pair party and the logical volume number of the disk subsystem in question) 603 of the S-VOLs 111 forming pairs with the P-VOLs 108; and attributes 604 indicative of "enable" or "disable" paired volume recreation of the S-VOLs 111. Meanwhile, the status management table of the RCU 104 in the FIGS. 6 and 7 manages logical volume numbers 605 (the manufacturing number ('1' in the drawings) of the disk subsystem as a target pair party and the logical volume numbers ("0:01" and "0:02" in the drawings) of the disk subsystem in question) of the S-VOLs 111; and copy execution statuses 606 of "duplex" and "suspend" of the S-VOLs 111.

With respect to the contents of the status management tables, before the user makes pairs, the RCU 104 as target pair part and the logical volumes under control of the RCU 104 are previously registered in the MCU 102. Further, the 'attribute' is used, after all the logical volumes in a volume group (to be described later) were changed to the "suspend" status, to determine the disk subsystem automatically determines which one of the paired logical volumes in the volume group for a paired volume recreation. The paired logical volume having the attribute of "enable" is the one which can make a pair immediately after all the paired logical volumes in the volume group were changed to the suspend status; whereas, the attribute of "disable" means the one which cannot make a pair thereafter. Explanation will be made on the assumption that a volume group contains two paired logical volumes in FIGS. 6 and 7.

The status of the logical volumes and state of the status management tables of the MCU 102 and RCU 104 at the time of finishing the operation of the step 202 of FIG. 4 correspond to a division (1) in FIG. 6.

When the MCU 102 and RCU 104 then detect a fault in the data transfer units, they temporarily stop (suspend status) the transfer and reflection of all the write data from the P-VOLs 108 to the RCU 104 (step 203). All the paired logical volumes associated with the P-VOLs 108 defined as the volume group are suspended. This is because, when the paired logical volume of the faulty data transfer unit is stopped and simultaneously when the other paired logical volume in the volume group is operated, this causes a shift of the consistency between the paired logical volumes of the volume group, which leads to the fact that the consistency in the data contents between the logical volumes in the volume group cannot be maintained any longer. That is, for the purpose of maintaining the consistency, all the paired logical volumes in the volume group are put in the suspend status to suppress occurrence of the inconsistency between the P-VOL and S-VOL and to ensure the data consistency. In the illustrated example, further, the contents of the S-VOLs at the time of the fault occurrence are all reflected on the T-VOLs. Meanwhile, when the volume group is not defined, the need for ensuring the consistency can be eliminated. Thus when one data transfer unit is stopped due to a fault, the status of the paired logical volumes so far using the faulty data transfer unit for transfer of the write data is changed from the duplex status to the suspend.

In the step 203, the P-VOL 108 and S-VOL 111 defined as the volume group by the respective status management tables are changed from the "duplex" to the "suspend" (division (2) in FIG. 6). As a result, all the paired logical volumes in the volume group are put in the "suspend" status, the reflection of the write data from the P-VOLs 108 to the S-VOLs 111 is interrupted, with the result that the data contents of the P-VOLs 108 coincides with those of the S-VOLs 111. Therefore, the status of the paired logical volumes at the time of finishing the operation of the step 203 and the state of the status management tables of the MCU 102 and RCU 104 correspond to the division (2) in FIG. 6.

In the RCU 104, next, when the status of the S-VOLs 111 is changed to the "suspend", the paired logical volumes of the S-VOL 111 and T-VOL 112 in the RCU 104 are put in the suspend status (step 204). The data contents of the T-VOLs 112 at this time point coincides with those of the S-VOLs 111 at the time of putting all the paired logical volumes in the volume group in the suspend status. In the subsequent steps, even when the data contents of the S-VOLs 111 is changed, the data contents of the T-VOLs 112 will not be changed. Meanwhile, the status of the paired logical volumes at the time of finishing the operation of the step 204 of FIG. 4 and the state of the status management tables of the MCU and RCU correspond to a division (3) of FIG. 6.

Next the RCU 104, when all the status of the paired logical volumes of the S-VOLs 111 and T-VOLs 112 are changed to the "suspend", reports the suspend completion to the MCU 102, which in turn accepts the report from the RCU 104 (step 205).

The MCU 102, when accepting the report, specifies one of the P-VOLs 108 having the attribute of "enable" in the status management table, and performs the paired volume recreation over the paired logical volume making a pair with the S-VOL 111 (step 206 in FIG. 5). That is, the MCU 102 changes the status of the logical volume of the attribute 'enable' in the status management table from the "suspend" to the "duplex", transfers the write data of the P-VOL 108 to the S-VOL 111; whereas, the RCU 104 accepts the write data to reflect it on the S-VOL 111, and informs the MCU 102 of the data acceptance. Accordingly, In the middle of the operation of the step 206 in FIG. 5, the status of the paired logical volumes and the state of the status management tables of the MCU and RCU correspond to a division (4) in FIG. 7. That is, during this period, the paired logical volumes in the volume group have two statuses of "suspend" and "duplex", and only for the paired logical volume in the "duplex" status, the write data of the P-VOL 108 are reflected (or written) on the S-VOL 111.

During this period, an updating or writing sequence of the paired logical volumes of the status "duplex" is maintained, whereas, the paired logical volumes of the status "suspend", when accepting the write data from the host unit, will not transfer the data to the S-VOL 111 and holds information about the storage position of the write data in the remote copy control information storage 117.

Thereafter when it is desired to recreate the paired logical volumes in the "suspend" status, the MCU 102 makes a copy of data corresponding to an updated or written part of the P-VOL 108 after changed to the suspend status to the S-VOL 111 on the basis of the information at the storage location. At this time, the MCU 102, when accepting the written data from the host unit during the copying operation, performs operation of reflecting the written data holding the writing sequence concurrently with the copying operation, as in the case of the above "duplex" status. As a result, the writing sequence of the paired logical volumes to be subjected to the paired volume recreation is ensured.

Further, in the operation of the step 206, when there are paired logical volumes not having a notification of data acceptance from the RCU 104, this means that the MCU 102 tried to transfer the data to the RCU 104 but could not transfer it for some reason. Thus the attributes associated with the paired logical volumes are changed to "disable" (step 207 in FIG. 5). The status of the paired logical volumes in the step 207 and the state change of the status management tables of the MCU and RCU are illustrated.

Meanwhile, the user continuously monitors periodically the status and attribute of the paired logical volumes in the volume group on the application 113 during the paired volume recreation to confirm that all the paired logical volumes of the "enable" attribute have the "duplex" status (step 208). The reason why the user continuously monitors the status and attribute is to confirm that all the paired logical volumes not affected by the stoppage of the data transfer unit were duplicated.

Figure 8:
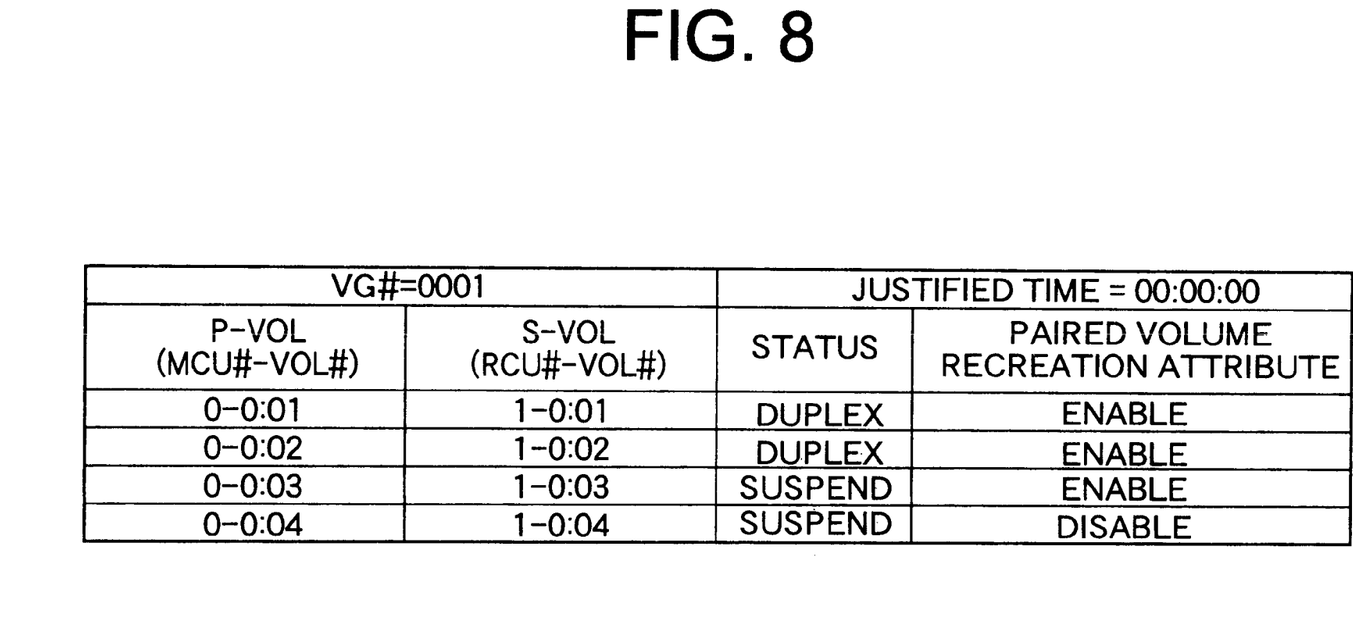
FIG. 8 shows an example of display of a display screen of application software.

FIG. 8 shows a display of a display screen on the application 113 for the user to confirm the above status and attribute. Information displayed on the screen include a justified time (00:00:00) in a volume group(VG#=0001), configuration information about the P-VOL 108 of the MCU 102 and the S-VOL 111 of the RCU 104 to be formed as paired logical volumes, and the status and paired volume recreation attribute of the paired logical volumes. In an example of FIG. 8, four paired logical volumes are included in the volume group, volume numbers of "0:01" and "0:02" have a paired volume recreation attribute of "enable" and a status of "duplex", which means that the volumes are already duplicated. The logical volume "0:03", which has a paired volume recreation attribute of "enable" and a status of "suspend", indicates a state to be next carried out in the step 206. That is, under this condition, the disk subsystem boots the paired volume re-synchronization. The logical volume "0:04", which has a paired volume recreation attribute of "disable", indicates that the interface cable currently being used by the paired logical volumes is faulty.

It is assumed in this case that the application 113 has a function of periodically collecting the paired volume recreation attribute and status as necessary from the disk subsystem and displaying such a table as shown in FIG. 8. Further, the "justified time" in FIG. 8 is a time on the basis of which a part of the write data accepted from the host unit until a given time is consistent in both sides of the MCU and RCU, which means that the data of the MCU and RCU sides are consistent. More specifically, at the time point of accepting the write data from the host unit, the MCU attaches a sequence number indicative of a writing order and a time (time stamp) of the write acceptance to the write data, and then transfers it to the RCU. In this connection, in times attached to the copy data received by the RCU, one of times continually arranged without any skip in the sequence number order, which is attached to copy data having the latest sequence number, is the justified time. Accordingly the application 113 can know completion of the duplication of a part of the data until a given time by looking at the justified time. The conception of the justified time using two MCUs will be explained (by referring to FIG. 3).

Turning again to the explanation of FIG. 5, the user removes the cause which led to the "suspend" of the paired logical volumes in the volume group. That is, the user removes the fault from the faulty data transfer units with a desired work and thereafter reboots them (step 209 in FIG. 5).

The user next issues an instruction on the application 113 to recreate all ones of the paired logical volumes in the volume group which are other than the already-recreated paired volumes in the foregoing and which have the attribute "disable". The MCU 102, when accepting the instruction, transfers the write data of the P-VOLs 108 to the S-VOLs 111 as in the above case of the paired volume recreation; whereas the RCU 104 accepts the write data, reflects it on the S-VOLs 111, and informs the MCU 102 of the data acceptance (step 210). A division (5) of FIG. 7 corresponds to the status of the paired logical volumes and the state of the status management tables of the MCU 102 and RCU 104 at the time point of completion of the operation of the step 210 in FIG. 5.

The user confirms on the application 113 that all the paired logical volumes in the volume group were changed to the "duplex" status. Since all the paired logical volumes associated with the P-VOLs 108 defined as the volume group were duplicated, the MCU 102 changes all the attributes of the status management table to the "enable". This means that the paired volume recreation of the volume group has been completed (step 211).

For preparation of the next paired volume recreation, the user issues an instruction to the MCU 102 on the application 114 to recreate a pair of the S-VOL 111 and T-VOL 112 (step 212), and the RCU 104 executes recreation of the paired logical volumes of the S-VOL 111 and T-VOL 112 according to the instruction from the MCU 102. The status of the paired logical volumes and the state of the status management tables of the MCU 102 and RCU 104 at the time point of completion of the operation of the step 212 in FIG. 5 correspond to a division (6) in FIG. 7. However, the status of the paired logical volumes in this division is the same as that of the division (1) of FIG. 6.

The summary of the above step is that, in the step 206, the paired volume re-synchronization of the paired logical volumes other than the paired logical volumes using the interface cable including the faulty data transfer unit was restarted. In other words, in this condition, the paired volume re-synchronization of the paired logical volumes associated with the not-faulty or normal interface cables is executed, while the paired volume re-synchronization (step 210) of the paired logical volumes so far using the faulty interface cable are not executed yet. And when compared with the conventional case where, when the fault is restored, the paired volume re-synchronization of all the paired logical volumes in the volume group is started; the paired volume re-synchronization of the paired logical volumes associated with the normal interface cables as well as the paired volume re-synchronization of the paired logical volumes so far using the faulty interface cable are executed with a time shift (a time difference between the steps 206 and 210). Accordingly the data transfer load of the public line 140 involved by the paired volume re-synchronization already explained in FIG. 1 will be dispersed with respect to time.

For this reason, data sent by the paired volume re-synchronization of the paired logical volumes associated with the normal interface cables is sent faster with respect to time than data sent by the paired volume re-synchronization of the paired logical volumes using the faulty interface cables. This means that the time necessary for the paired volume re-synchronization in the present invention is shorter than that in the prior art system. In other words, the paired volume re-synchronization of the paired logical volumes using the normal interface cables is already started when the fault was removed. Therefore, when compared with the case where the re-synchronization of all the paired logical volumes after the fault removal, a data transfer amount at the time of the paired volume re-synchronization of the paired logical volumes after the fault removal is less required, and the paired volume re-synchronization is completed after the fault removal. That is, a time necessary for returning to the normal operation is made short.

In the step 204, after the S-VOLs were changed to the "suspend" status, the paired logical volumes of the S-VOL and T-VOL are also changed to the "suspend" status, thus holding the data state of the volume group at the time of a fault occurrence. For this reason, even when a new fault takes place in the middle of the paired volume re-synchronization of a part of the paired logical volumes to produce an abnormal status management and this leads to the fact that the normal relationship between the P-VOL and S-VOL cannot be kept and the abnormal state cannot be recovered, the present invention can recover the abnormal state using the data of the T-VOL. Thus the present invention can keep a data guarantee level higher than the prior art where the fault is restored and then all the paired logical volumes are restarted.

The above explanation has been made as to the case where one of the plurality of data transfer units forming the interface cables 109 and multiple line/public network interface I/F 130 was stopped due to a fault. Explanation will next be made as to a case where the data transfer unit is intentionally stopped.

(2) As to Periodically Stopping Data Transfer Unit

In order to intentionally stop a data transfer unit due to maintenance or configuration change, the user first issues an instruction from the application 113 to change the status of all the paired logical volumes in the volume group to the "suspend" (step 214 in FIG. 4). The status of the paired logical volumes when the operation of the step 214 in FIG. 4 was finished, corresponds to the division (1) of FIG. 6.

The MCU 102, when accepting the suspend instruction, changes the status of the status management table managed by the MCU 102 from the "duplex" to the "suspend" and issues an instruction to the RCU 104 to change the status of the table thereof similarly. The RCU 104, when accepting the instruction from the MCU 102, changes the status of the status management table managed by the RCU 104 from the "duplex" to the "suspend". Thereby all the paired logical volumes in the volume group are put in the "suspend" status where the reflection of the write data of the P-VOL 108 on the S-VOL 111 is suspended, and the data contents of the P-VOL 108 coincides with those of the S-VOL 111 (step 203 in FIG. 4). The status of the paired logical volumes when the operation of the step 203 was completed corresponds to the division (2) of FIG. 6. And for the purpose of intentionally stopping the data transfer unit, the user stops the data transfer unit at this time point (step 215 in FIG. 4).

When the status of the S-VOL 111 is changed to the "suspend", the RCU 104 next changes the status of the paired logical volumes of the S-VOL 111 and T-VOL 112 in the RCU 104 to the "suspend". At this time point, the data contents of the T-VOL 112 coincides with the data contents of the S-VOL 111 when all the paired logical volumes of the volume group are changed to the "suspend". Further, from this time on, even when the data contents of the S-VOL 111 was changed, the data contents of the T-VOL 112 will not be changed (step 204 in FIG. 4). The status of the paired logical volumes when the operation of the step 204 in FIG. 4 was completed corresponds to the division (3) of FIG. 6.

Next, when the MCU 102 accepts from the RCU 104 a notification that the paired logical volumes of the S-VOL 111 and T-VOL 112 were changed to the "suspend" status, the MCU 102 identifies the P-VOL 108 having an attribute "enable" in the status management table and performs the paired volume recreation over the paired logical volumes as a pair of the P-VOL 108 and S-VOL 111. That is, the MCU 102 transfers the write data of the P-VOL 108 to the S-VOL 111, whereas, the RCU 104 accepts the write data, reflects it on the S-VOL 111, and informs the MCU 102 of the data acceptance (step 206 in FIG. 5). The status of the paired logical volumes when the operation of the step 206 in FIG. 5 was completed corresponds to the division (4) of FIG. 7.

In the step 206, the paired volume recreation is carried out over all the paired logical volumes in the volume group. With respect to the paired logical volumes whose duplication maintenance cannot be kept due to the stoppage of the data transfer unit, however, the RCU 104 does not inform the MCU 102 of the write data acceptance. In this case, the MCU 102 stops the transfer of the write data of the paired logical volumes not informed, that is, the transfer of the write data of the P-VOL 108 and changes the attribute from the "enable" to the "disable" (step 207 in FIG. 5). With respect to the paired logical volumes informed of the write data acceptance from the RCU 104, the MCU 102 continues to transfer the write data. As a result, a part of the paired logical volumes in the volume group can be made a pair.

Next the user releases the paired logical volume intentionally put in the suspend status from the volume group.

That is, the user reboots the data transfer unit so far intentionally stopped (step 209 in FIG. 5).

Then the user, when confirming that the data transfer unit was rebooted, issues an instruction from the application 113 to perform the paired volume recreation over all the paired logical volumes of the attribute "disable" other than the paired volumes so far recreated among the paired logical volumes in the volume group. As in the case of the aforementioned paired volume recreation, the MCU 102, when accepting the instruction, transfers the write data of the P-VOL 108 to the S-VOL 111; whereas, the RCU 104 accepts the write data, reflects it on the S-VOL 111, and informs the MCU 102 of the data acceptance (step 210 in FIG. 5). The status of the paired logical volumes and the state of the status management tables of the MCU and RCU when the operation of the step 210 in FIG. 5 was completed, correspond to the division (5) of FIG. 7.

The user confirms on the application 113 that all the paired logical volumes in the volume group were changed to the "duplex" status. Further, since all the paired logical volumes of the P-VOL 108 and S-VOL 111 defined as the volume group were duplicated, the MCU 102 and RCU 104 change all the attributes of the status management tables to the "enable". As a result, all the paired logical volumes in the volume group have been recreated pairs (step 211 in FIG. 5).

For preparation of the next paired volume recreation, the user also recreates pairs of the paired logical volumes of the S-VOL 111 and T-VOL 112 on the application 114 (step 212 in FIG. 5). Although the status of the paired logical volumes and the state of the status management tables of the MCU 102 and RCU 104 when the operation of the step 212 in FIG. 5 was completed, correspond to the division (6) of FIG. 7, the status of the paired logical volumes in that division is the same as the status of the division (1) in FIG. 6 before the data transfer unit is stopped.

As has been explained above, even the data transfer unit was intentionally stopped, as in the case of the data transfer unit stopped due to the fault, the paired volume re-synchronization of the paired logical volumes using the interface cables not including the intentionally-stopped data transfer unit is restarted before rebooting of the stopped data transfer unit. Thus, when compared with the case where all the paired logical volumes are re-synchronized after completion of the intentional stoppage of the data transfer unit, a data transfer amount at the time of the paired volume re-synchronization after the intentional stoppage is less required. As a result, a time taken from the completion of the intentional stoppage of the data transfer unit to the completion of the paired volume re-synchronization is made short.

The foregoing explanation has been made as to the case where, due to the unexpected fault or intentional stoppage of one of the data transfer units for its maintenance forming the interface cables 109 and multiple line/public network interface I/F 130, the copying of all the paired logical volumes so far duplicated in the volume group is once stopped and all the paired logical volumes in the volume group are again duplicated.

In the present embodiment, though not explained in detail, the user may issue an instruction on the application not only from the host unit but also from a management console exclusive to the disk subsystem. Further, when the data transfer unit is intentionally stopped, the user may identify the paired logical volumes which cannot recreate a pair due to the stoppage of the host unit, and give an instruction from the application to change the attribute of the logical volume to the "disable". Further, the remote copying configuration in accordance with the present embodiment has been applied to the system configuration where the MCU 102 of the main center 101 is connected to the RCU 104 of the remote center 103 in a 1:1 relationship as shown in FIG. 1. However, the remote copying configuration may also be applied as another embodiment to a case when a plurality of MCUs 102 are associated with a single RCU 104, when a single MCU 102 is associated with a plurality of RCUs 104, or when a plurality of MCUs 102 are associated with a plurality of RCUs 104.

Figure 3:
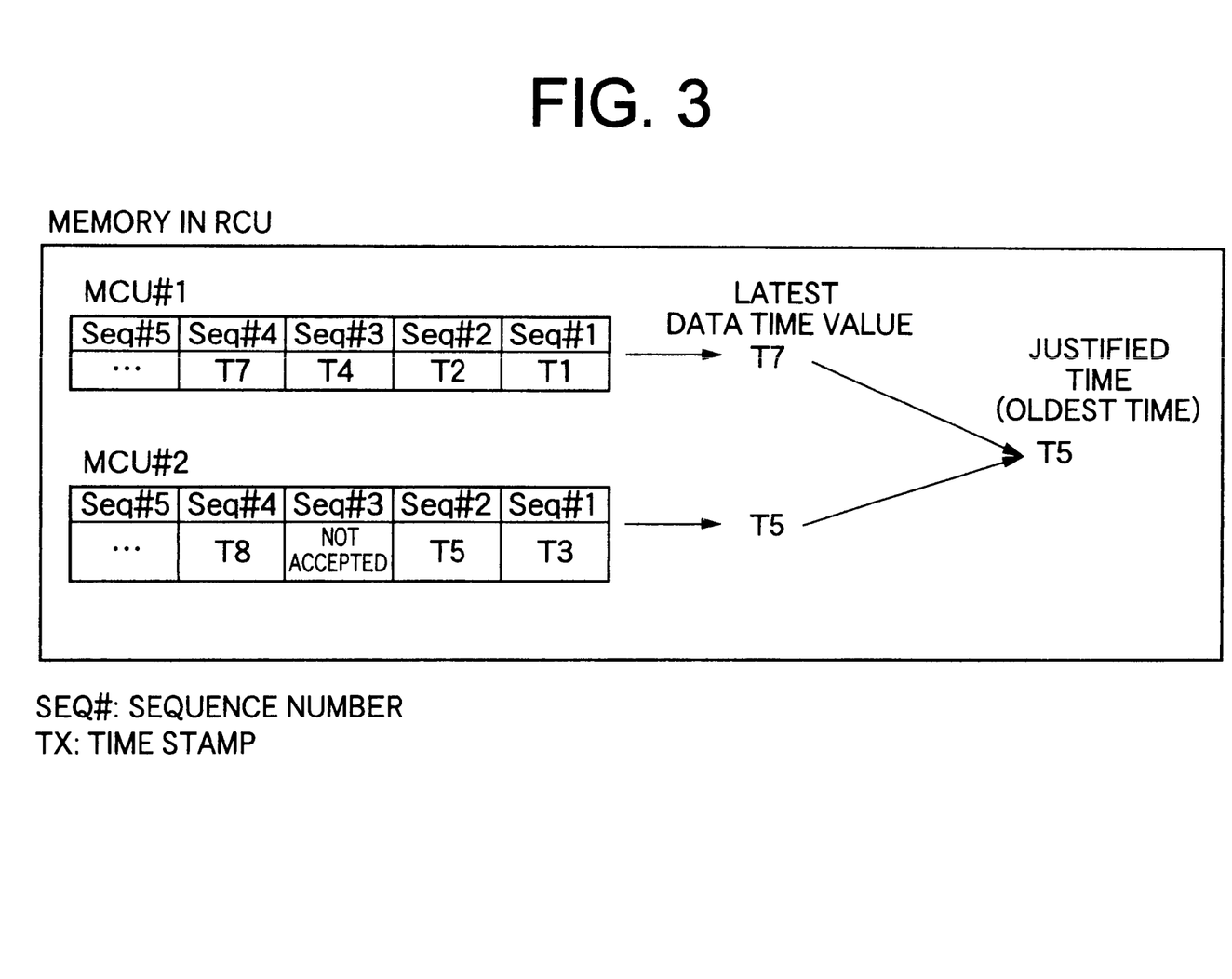
FIG. 3 is a conceptual view of how to determine a justified time.

When a plurality of MCUs 102 are associated with a single RCU 104, the mechanism of maintaining the data writing sequence of the volume group becomes complicated, it will be first explained with reference to FIG. 3. The MCU 102, when accepting the write data from the host unit 105, attaches a time stamp and a sequence number to the write data, and delivers the data to the RCU 104 asynchronously with the data writing by the write instruction of the host unit 105. The order of the accepted write data does not coincide necessarily with the order of the sequence number in the RCU 104, so that the write data are rearranged in the sequence number order and then written in a memory within the RCU 104. Further, the RCU 104 manages the accepted write data for each MCU as a sender originator. The criterion of this management is, e.g., the manufacturing number of the disk subsystem which can identify each MCU.

Next the RCU 104 finds the time value (time stamp) of the latest one of the data having the ensured sequence for each MCU. In the example of FIG. 3, the time value of the latest data of the MCU#1 is T7, and the time value of the latest data of the MCU#2 is T5. And the time values of the latest data between the MCUs are compared, the oldest time is determined as the justified time (time with a consistent writing sequence kept) and the S-VOL 111 of the magnetic disk drive reflects data prior to the time value. In the example of FIG. 3, the justified time is T5 and the S-VOL 111 reflects data prior to T5. Further, even when there are a plurality of RCUs, the time values of the latest data are compared between the RCUs and the oldest time value is set as the justified time.

In the summary of the present invention, among the paired logical volumes defined as the volume group, the paired logical volumes not affected by the held duplication even after the stoppage of the data transfer unit continuously maintain the duplication even during the stoppage of the unit, and only the paired logical volumes which cannot hold the duplication due to the stoppage of the unit are duplicated after recovery of the unit (paired volume recreation). Thus, the duplicating capacity after the recovery of the unit becomes smaller than the capacity of all the paired logical volumes in the volume group. As a result, a time taken up to completion of the paired volume recreation of all the paired logical volumes in the volume group can be made shorter than that when all the paired logical volumes in the volume group are collectively subjected to the paired volume recreation, enabling earlier duplication. Further, since the present invention uses such a writing procedure as shown in FIG. 3, even when there are a plurality of sender side MCUs, the time necessary for the paired volume recreation after stoppage of the data transfer unit can be shortened with the ensured consistency of the data. At this time, when the justified time is used, even a data time ensured by the volume group can be known.

The above explanation has been made in connection with the case where the public line for transmission of data to the remote subsystem has a data transfer delay fault. However, so long as the transmission line is limited in its data transmission capability for some reason (for example, the data transfer capability is limited by other remote copy or traffic, a bad transfer quality causes frequent retransmission, requiring a lot of transmission time, etc.) during transmission of the data for paired volume recreation from the main center to the remote center, a time for necessary for the paired volume recreation can be shortened by applying the present invention thereto, that is, by shifting the paired volume recreation timing.

In the foregoing explanation, further, although the user issued the instruction to start the paired volume recreation of the volumes associated with the data transfer units not stopped, microprocessors in the MCU and RCU may automatically judge the contents of the status management tables and issue an instruction to perform the paired volume recreation.

In the remote copy function, by carrying out the paired volume recreation of paired logical volumes in the volume group sequentially on each volume basis, a time taken until completion of the paired volume recreation of all the paired logical volumes in the volume group can be reduced.

What is claimed is:

1. A remote copy method of remotely copying data between a copy source storage system and a copy destination storage system, wherein said copy source storage system has a plurality of primary volumes and is connected to an external communication network through a plurality of interface cables, each of said primary volumes being associated with at least one interface cable, wherein said copy destination storage system has a plurality of secondary volumes corresponding to said plurality of primary volumes and is connected to said external communication network through a plurality of interface cables, said secondary volumes and primary volumes forming a plurality of paired volumes, each of said secondary volumes being associated with at least one interface cable of second type, said copy source storage system maintaining management information including pair status information and attribute information, the method comprising:

providing first paired volumes and second paired volumes, said first paired volumes including a first primary volume of said primary volumes and a first secondary volume of said secondary volumes, said second paired volumes including a second primary volume of said primary volumes and a second secondary volume of said secondary volumes, a first interface cable set assigned to said first paired volumes, the first interface cable set including a portion assigned to said first primary volume and a portion assigned to said first secondary volume, a second interface cable set assigned said second paired volumes, said second interface cable set including a portion assigned to said second primary volume and a portion assigned to said second secondary volume;

detecting a fault relating to said first interface cable set or said first paired volumes;

changing said attribute information of said first primary volume of said first paired volumes from an enable state to a disable state upon detecting said fault, said attribute information of said second primary volume being left unchanged at an enable state;

changing said pair status information of said first and second primary volumes from a duplex state to a suspend state;

changing said pair status information of said second primary volume from said suspend state back to said duplex state while leaving said pair status information of said first primary volume at said suspend state, so that data may be copied from said second primary volume to said second secondary volume; and changing said pair status information of said first primary volume from said suspend state back to said duplex state after resolving said fault detected at said detecting step, so that data may be copied from said first primary volume to said first secondary volume.

2. The method of claim 1, further comprising:
changing said attribute information of said first primary volume from said disable state back to said enable state prior to changing said pair status information of said first primary volume.

3. The method of claim 1, further comprising:
copying said data received from said primary volumes to a plurality of destination volumes from said secondary volume, said destination volumes being provided in said copy destination storage system.

4. The method of claim 3, wherein a write order at said copy source storage system is reflected at said copy destination storage system to guarantee data consistency.

5. The method of claim 1, wherein a write order at said copy source storage system is reflected at said copy destination storage system to guarantee data consistency.

6. A method for re-synchronizing paired volumes, the method comprising:

providing first paired volumes and second paired volumes, the first paired volumes including a first primary volume of a primary storage system and a first secondary volume of a secondary storage system, the second paired volumes including a second primary volume of the primary storage system and a second secondary volume of a secondary storage system;

changing first attribute information corresponding to the first primary volume from a first state to a second state upon detecting a data transmission problem for the first paired volume, second attribute information corresponding to the second primary volume being left unchanged at a first state;

changing first and second pair status information of the first and second primary volumes from a third state to a fourth state, the first pair status information corresponding to the first paired volumes, the second pair status information corresponding to the second paired volumes;

changing the second pair status information of the second primary volume from the fourth state back to the third state while leaving the first pair status information of the first primary volume at the fourth state, so that data may be copied from the second primary volume to the second secondary volume although data may not be copied from the first primary volume to the first secondary volume; and changing the first pair status information of the first primary volume from the fourth state back to the third state after the detected data transmission problem for the first paired volumes has been fixed, so that data may be copied from the first primary volume to the first secondary volume.

7. The method of claim 6, wherein a first interface cable set is assigned to the first paired volumes and a second interface cable set is assigned to the second paired volumes, the first and second interface cable sets being coupled to an external communication network.

8. The method of claim 7, further comprising:
copying data from the secondary volumes to a plurality of destination volumes provided in the secondary storage system, the data being copied to the destination volumes being the data received from the primary volumes, wherein a data write order at the secondary storage system reflects a data write order at the primary storage system.

9. The method of claim 8, wherein the primary and secondary storage systems together provide a plurality of paired volumes, each paired volumes being assigned to at least one interface cable set that is coupled to an external network.

10. A storage system configured to perform remote copy operations, comprising:

a primary storage subsystem including a plurality of primary volumes, each of the primary volumes being assigned to at least one interface cable of first type;

a secondary storage subsystem including a plurality of secondary volumes, each of the secondary volumes being paired with one of the primary volumes provided in the primary storage subsystem and assigned to at least one interface cable of second type, wherein the primary and secondary volumes together define a plurality of paired volumes, each of the paired volumes being assigned to an interface cable set including an interface cable of first type and an interface cable of second type;

a fault detecting unit operable to detect a fault occurrence on the interface cables in such a way to identify an identity of paired volumes affected by the fault;

a storage area including management information including attribute information and pair status information, the attribute information indicating whether or not a given volume is ready to transmit data to a corresponding volume, the pair status information indicating a pairing state of a given paired volumes; and a computer readable medium including a program, the program including:

code for changing the attribute information of a given primary volume from an enable state to a disable state if a fault is detected from a given interface cable set associated with a given paired volumes that includes the given primary volume;

code for changing the pair status information of all of the plurality of paired volumes from a duplex state to a suspend state, so that data transmission from the primary volumes to the secondary volumes is suspended;

code for changing the pair status information of the primary volumes other than the given primary volume back to the duplex state, so that these other primary volumes may resume transmitting data to their corresponding secondary volumes;

code for changing the attribute information of the given primary volume back to the enable state once the detected fault has been resolved; and code for changing the pair status information of the given paired volumes back to the duplex state, so that the given primary volume may be commence transmitting data to a secondary volume that has been paired to the given primary volume.

11. A storage system, comprising:

a plurality of primary volumes, each of the primary volumes being assigned to at least one interface cable of first type and associated with at least one secondary volume to form paired volumes;

a fault detecting unit operable to detect a fault occurrence on the interface cable in such a way to identify an identity of paired volumes affected by the fault;

a storage area including management information including attribute information and pair status information, the attribute information indicating whether or not a primary volume may to transmit data to a corresponding secondary volume, the pair stats information indicating a pairing state of a given paired volumes; and a computer readable medium including a program, the program including:

code for changing the attribute information of a given primary volume from an enable state to a disable state if a fault is detected from a given interface cable set associated with a given paired volumes that includes the given primary volume;

code for changing the pair status information of all of the primary volumes from a duplex state to a suspend state, so that data transmission from the primary volumes to the secondary volumes is suspended;

code for changing the pair status information of the primary volumes other than the given primary volume back to the duplex state, so that these other primary volumes may resume transmitting data to their corresponding secondary volumes while the given paired volumes including the given primary volume remains in the suspend state;

code for changing the attribute information of the given primary volume back to the enable state once the detected fault has been resolved; and code for changing the pair status information of the given primary volumes back to the duplex state, so that the given primary volume may commence transmitting data to the corresponding secondary volume.

* * * * *